(12) United States Patent
Arnoud et al.

(10) Patent No.: US 9,405,022 B2
(45) Date of Patent: Aug. 2, 2016

(54) X-RAY DETECTOR

(71) Applicants:Centre National de la Recherche Scientifique, Paris (FR); Universite Joseph Fourier, Grenoble (FR)

(72) Inventors: Yannick Arnoud, Saint Egreve (FR); Olivier Guillaudin, Claix (FR)

(73) Assignees: Centre National de la Recherche Scientifique, Paris (FR); Universite Grenoble Alpes, Saint Martin d'Heres (FR)

( * ) Notice: Subject to any disclaimer, the term of this patent is extended or adjusted under 35 U.S.C. 154(b) by 0 days.

(21) Appl. No.: 14/890,573

(22) PCT Filed: May 15, 2014

(86) PCT No.: PCT/FR2014/051132
§ 371 (c)(1),
(2) Date: Nov. 11, 2015

(87) PCT Pub. No.: WO2014/184496
PCT Pub. Date: Nov. 20, 2014

(65) Prior Publication Data
US 2016/0116613 A1     Apr. 28, 2016

(30) Foreign Application Priority Data
May 15, 2013 (FR) .................................... 13 54339

(51) Int. Cl.
*G01T 1/185*   (2006.01)
*G01T 1/29*    (2006.01)

(52) U.S. Cl.
CPC .................................. *G01T 1/2935* (2013.01)

(58) Field of Classification Search
CPC ..................................................... G01T 1/2935
See application file for complete search history.

(56) References Cited

U.S. PATENT DOCUMENTS

2007/0075252 A1   4/2007 Misawa
2013/0009267 A1   1/2013 Henseler et al.

FOREIGN PATENT DOCUMENTS

DE   102011018714 A1   10/2012
FR      2974186 A1      10/2012

OTHER PUBLICATIONS

Written Opinion, dated Aug. 25, 2014 from corresponding International Application No. PCT/FR2014/051132.
International Search Report, dated Aug. 25, 2014, from corresponding International Application No. PCT/FR2014/051132.

*Primary Examiner* — Mark R Gaworecki
(74) *Attorney, Agent, or Firm* — Wolf, Greenfield & Sacks, P.C.

(57) ABSTRACT

The invention relates to a matrix device for measuring characteristics of an X-ray beam. The device includes a first set of detection cells of a size different from the cells of at least one second set of detection cells. Each cell corresponds to an ionization chamber including a detection electrode. The detection electrodes of all the cells have the same effective surface for collecting charges.

5 Claims, 6 Drawing Sheets

X-RAY DETECTOR

CROSS-REFERENCE TO THE RELATED APPLICATIONS

This application is a national stage filing under 35 U.S.C. §371 of International PCT Application PCT/FR2014/051132, filed May 15, 2014, entitled "X-RAY DETECTOR," which claims priority to French Application No. 13/54339, filed May 15, 2013, each of which applications is incorporated herein by reference to the maximum extent allowable by law.

BACKGROUND

The present invention relates to a device for measuring the characteristics of an X-ray beam and more particularly such a device capable of being used in relation with radiotherapy installations.

DISCUSSION OF THE RELATED ART

A radiotherapy installation will be described in relation with FIGS. 1 to 3.

As illustrated in FIG. 1, such an installation comprises an X-ray source 1 sending an X-ray beam towards a patient 3. A diaphragm or collimator 5 enables to delimit the X-ray beam reaching the patient to an area corresponding to an organ 7 which is desired to be irradiated.

FIG. 2 shows in top view an example of a collimator 5. It is a multi-leaf collimator intended to adapt the shape of the X-ray beam to that of organ 7 which is desired to be irradiated. Opposite leaves 11 and 12 of multi-leaf collimator 5 are positioned to leave at the center of the collimator an opening 13 having a shape homothetic to that of organ 7 to be irradiated.

Further, a motion of all or part of the leaves or of the entire diaphragm is often provided during a radiation treatment session so that, during chosen time periods, certain portions of the organ to be irradiated are irradiated with more intensity than others. Curve 15 shows the total irradiation I which can thus be obtained at each location of the organ.

Such radiation treatment installations are subject to failures which may have tragic consequences on a patient's treatment. Either the applied doses are insufficient and the treatment is inoperative. Or the inadiation density erroneously provided in other organs may cause their radiosensibilization, which may induce cancers with a delayed onset.

Accordingly, in certain recent installations, an irradiation detector such as that schematically shown and designated with reference numeral 9 in FIG. 1 has been provided behind the collimator. This detector absorbs a small part only of the X-ray beam which crosses it and enables to follow the space distribution of the intensity of the inadiation during a radiotherapy session.

Document DE 10 2011 018714 is an example of such an installation.

FIG. 4 is a cross-section view of a portion of an example of an X-ray detector, which may be used in radiotherapy. In this drawing, the vertical dotted lines show the volume of a cell, and the cells altogether provide an integral coverage with no dead zone. FIG. 5 is a top view of the lower plate of the detector. Detector 20 comprises a large number of X-ray detection cells 22. The cells all have the same size and are arranged next to one another in a matrix, with no dead zone. Each cell 22 comprises, between an upper plate or sheet 24 and a lower plate or sheet 25, an ionizing chamber 26 filled with a gas, possibly simply air at an adapted pressure. An upper electrode 28 formed on the internal surface of upper plate 24 is common to all the cells and is connected in operation to an external voltage generator, which provides a potential difference with respect to lower electrodes. Upper electrode 28 may also be a metal grid, permeable to gas and having a high transparency. In this case, there of course is no upper plate 24. A lower electrode 29 formed on the internal surface of lower plate 24 is specific to each cell and is connected in operation most often to a virtual ground (zero potential), imposed by the electronic detection circuits. A positive or negative potential difference is thus present between the upper electrode and the lower electrodes, according to the desired applications.

The operation of this detector will now be described.

A photon X, X1, reaching the upper surface of a cell 22 is considered. At the level of plate 24, of electrode 26, or of an additional layer, not shown, photon X1 is capable of interacting and of providing a fast electron, of high kinetic energy, e1, which penetrates into the ionization chamber. Electron e1 is capable of interacting with a molecule of the gas contained in the chamber, for example, a nitrogen molecule to provide positively-charged dinitrogen $N_2+$. Unlike electron e1, the charged dinitrogen will have a low kinetic energy and is thus capable of being attracted by lower electrode 29. Fast electron e1 continues its travel, possibly after having been deviated, and may ionize another molecule. At the end of its travel, electron e1, even if it reaches an electrode, will not be detected since it would provide too short a pulse with respect to current detection circuit read speeds.

Whatever the location in the volume of the detector where the charged molecules are created, said molecules will deliver a signal which will be collected by influence, on displacement thereof, on at least one electrode of type 29. A full control of the entire X-ray beam is thus ensured, all non-conformities being bound to be noticed.

The foregoing is an example only of the various possible interactions. In known fashion, photon X1, instead of providing a fast electron e1, could provide a pair of an electron and of a positron. Also, instead of interacting with a nitrogen molecule to provide positively-charged dinitrogen, electron e1 may interact with an oxygen molecule to provide positively-charged dioxygen. Intermediate particles may also form. Further, generally, the interaction of a fast electron with a molecule will provide not only a charged molecule, but also an electron of small kinetic energy which may also be detected, after a possible bonding to a neutral molecule, for example forming a negative dioxygen.

In a detector containing a large number of ionization chambers, for example, 100×100, if each lower electrode 29 is desired to be individually connected to an electronic read circuit, 10,000 metal tracks running on lower surface 25 will have to be provided. Now, current manufacturing methods limit the track density, and it will be necessary to distribute these tracks over a plurality of stages to provide an adequate galvanic isolation. The effective thickness of lower portion 25 will accordingly increase and will absorb part of the incident X-ray flow, and will thus decrease the general transparency of the detector.

A row-column type multiplexing may also be used. A matrix addressing is obtained by associating the row metallizations and the column metallizations with two different multiplexers. A disadvantage of this embodiment is that the cells are analyzed at best row by row, which increases the read time.

Another solution comprises combining the two previous solutions. A system cumulating the advantages, but also the disadvantages, of multiplexing and of individual connections, is thus obtained.

The general detector thickness depends on the thickness of the upper plate or grid, and on the thickness of the lower plate. Lower plate 25 is generally the thickest. The thickness and the general transparency of the detector are independent from its high-low or low-high orientation relative to photon beam X1. To guarantee the largest number of interactions and provide the largest number of detectable particles, the detector may be flipped, so that photons X1 first cross the thickest portion, generating more fast electrons e1. The rest of the detector operation remains unchanged.

There is a need for an improved X-ray detector particularly adapted to radiotherapy installations.

SUMMARY

Thus, an embodiment provides a matrix device for measuring the characteristics of an X-ray beam, comprising a first set of detection cells having a different size than the cells of at least one second set of detection cells, each cell corresponding to an ionization chamber comprising a detection electrode, the detection electrodes of all cells having a same effective charge collection surface area.

According to an embodiment, the device comprises three sets of detection cells distributed in a central area, an intermediate area, and a peripheral area.

According to an embodiment, the intermediate area contains cells having a surface area four times larger than the surface area of the cells of the central area and the peripheral area contains cells having a surface area nine times larger than the surface area of the cells of the central area.

According to an embodiment, the detection electrodes of the largest cells have a lattice shape and the spaces delimited by each lattice are occupied by reference electrodes connected to a reference potential.

According to an embodiment, the reference potential is the ground and the detection electrodes are connected, in operation, to a virtual ground.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the various drawings and, further, as usual in the representation of integrated circuits, the various drawings are not to scale.

DETAILED DESCRIPTION

Figure 6:
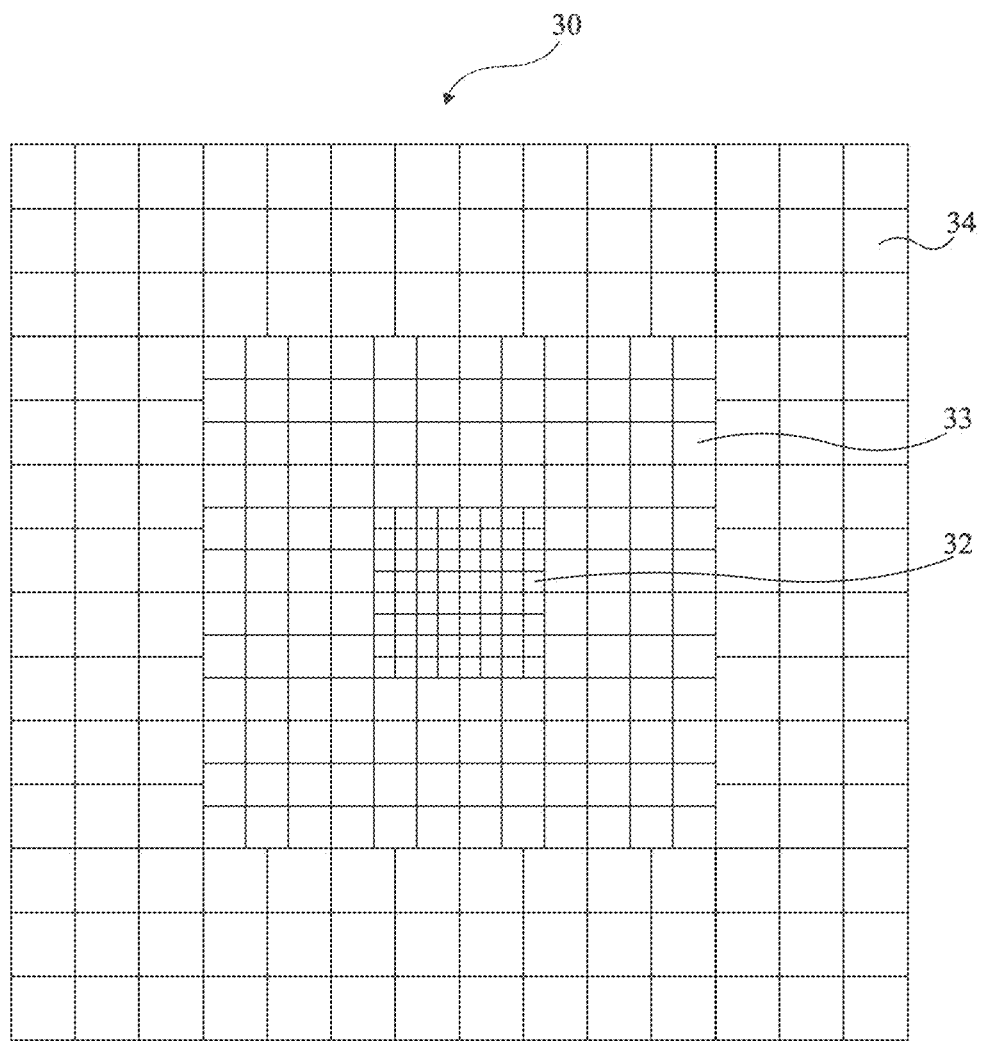
FIG. 6 is a top view of an embodiment of a matrix X-ray detector.

FIG. 6 is a top view of an embodiment of a matrix X-ray detector 30. This view is extremely simplified and only has the purpose of illustrating the variety of the cells of the provided detector. Detector 30 comprises a central area 32, an intermediate area 33, and a peripheral area 34, each containing detection cells. In top views, the cells of a same area all have the same size and the cells of different areas have different sizes.

Detector 30 has the same general dimensions as previously-described detector 20 but comprises less cells since certain cells are larger than the cells of a regular detection matrix. Indeed, the inventors have noted that in practice, although it is important to have an indication of the distribution of the X-ray intensity across the entire detector, that is, across the entire extension of the maximum irradiated area on a patient, this measurement has to be extremely accurate in an area of the detector which corresponds to an area of the multi-leaf collimator which is almost always open, that is generally, the center of the collimator. Conversely, the areas where the patient is less likely to be irradiated can be found at the periphery. It is then less important to have as accurate an information as to the irradiation in these areas, which should however be measured to avoid any risk of incident.

The fact of decreasing the number of cells of course decreases the number of connections to these cells, for a cell addressing as well as for an addressing using multiplexers and rows and column groups, as previously discussed.

Figure 1:
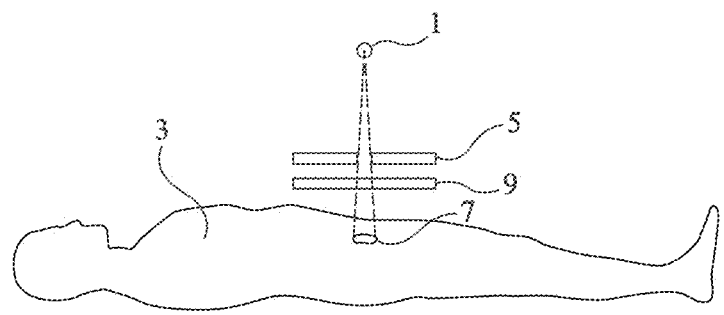
FIG. 1, previously described, schematically shows a radiation treatment installation used in radiotherapy.
Figure 2:
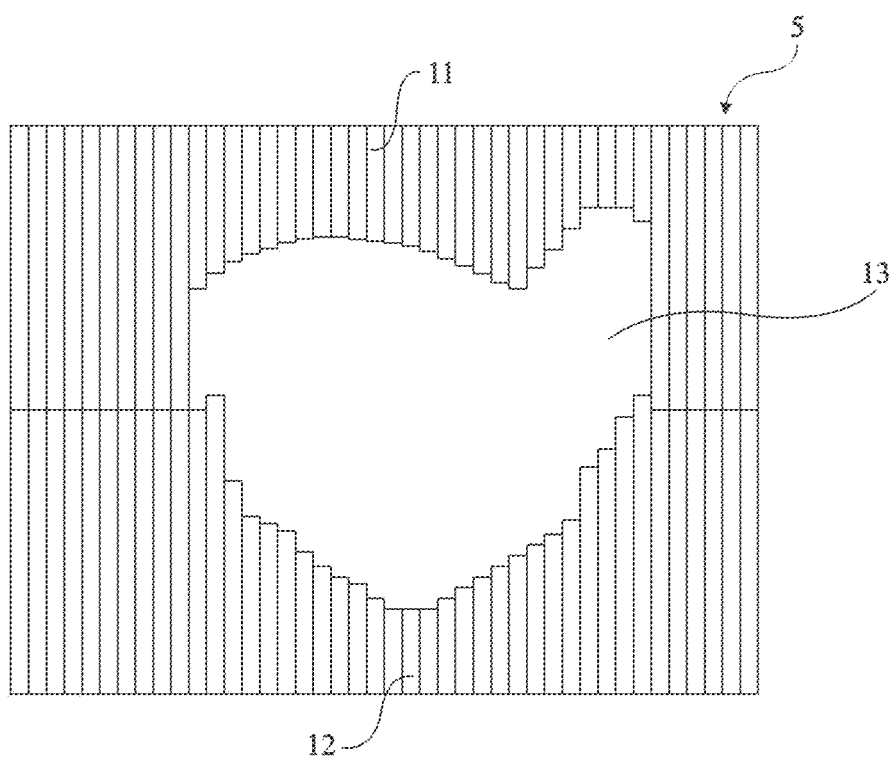
FIG. 2, previously described, is a top view of a multi-leaf collimator.
Figure 3:
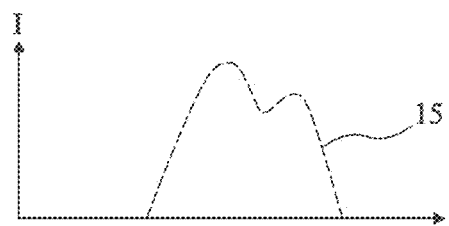
FIG. 3, previously described, is a curve showing the desired irradiation of an organ during a radiotherapy session.
Figure 4:
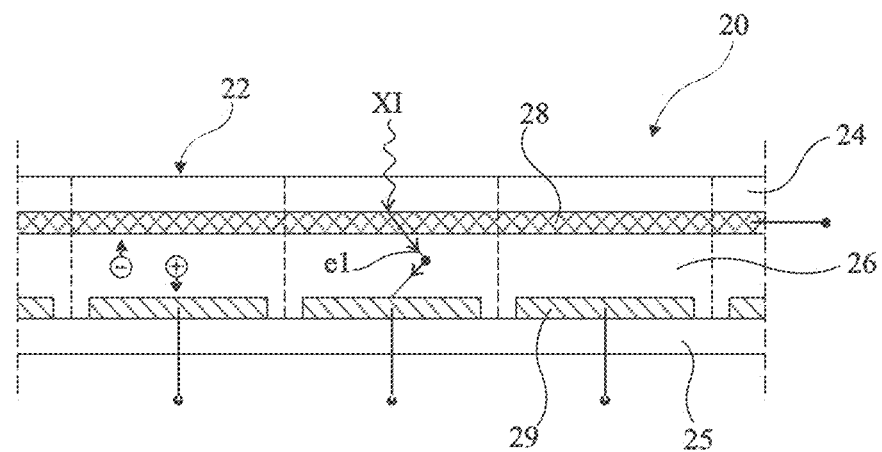
FIG. 4, previously described, is a cross-section view of a few adjacent cells of a matrix X-ray detector.

It is here provided not only to adopt the matrix structure to cells of unequal dimensions such as described in relation with FIG. 6, but also to modify the cells, so that the collection surface area corresponding to the lower electrodes of FIG. 4 is identical for all cells. Indeed, this enables to use amplifiers or other buffer and read circuits of same characteristics for the different cells. In the absence of such a layout, the cells of larger size receiving a much stronger irradiation than cells of smaller size, amplifiers or other detection circuits having a much greater dynamic range than in small cells should be provided for such large cells. In the example of FIG. 6, where the cells are in a 1/4/9 surface area relationship, large cells should be associated with amplification and/or dynamic range detection circuits nine times larger than for small ones. This would impose significant constraints to the read circuits.

It is thus here provided for all cells to have a same charge collection surface area, whatever the cell size. All cells may thus be associated with same detection circuits having the same dynamic range.

Figure 5:
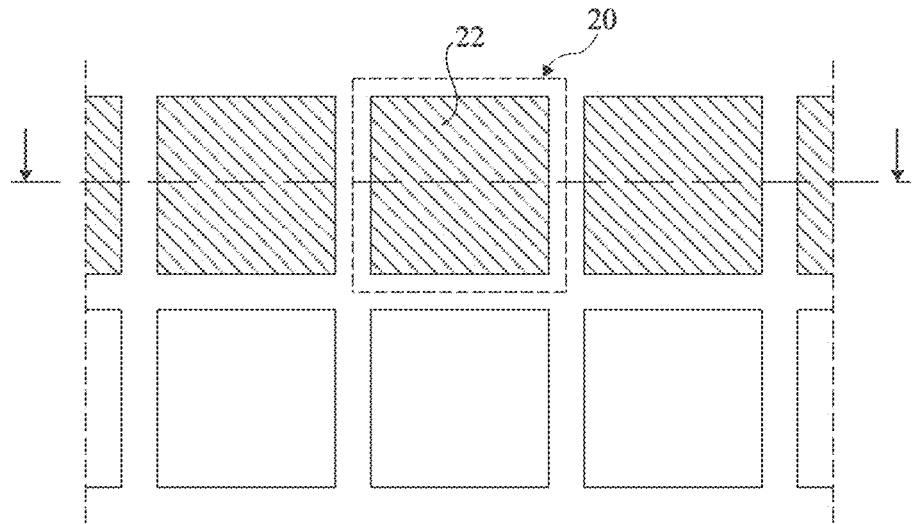
FIG. 5, previously described, is a top view of the lower plate of a few adjacent cells of a matrix X-ray detector.

In an embodiment of the detector provided herein, the cells of smaller size are configured like the cells previously described in relation with FIGS. 4 and 5.

Figure 7A:
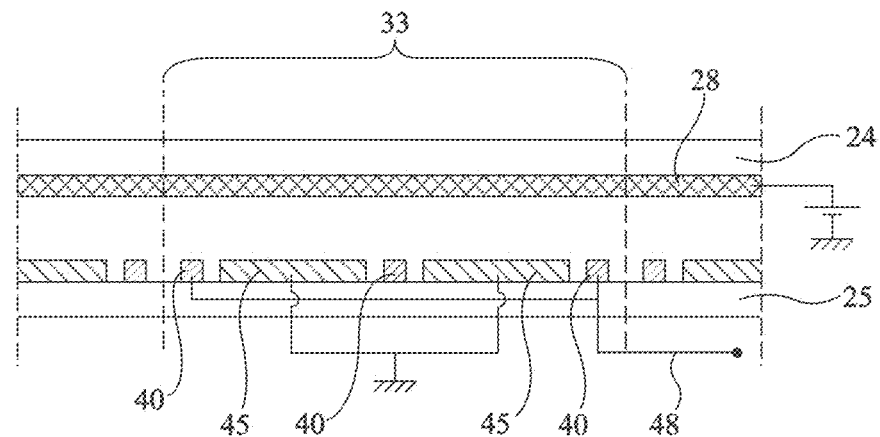
FIGS. 7A and 7B respectively are a cross-section view and a top view of an embodiment of an elementary cell of quadruple surface area.
Figure 7B:
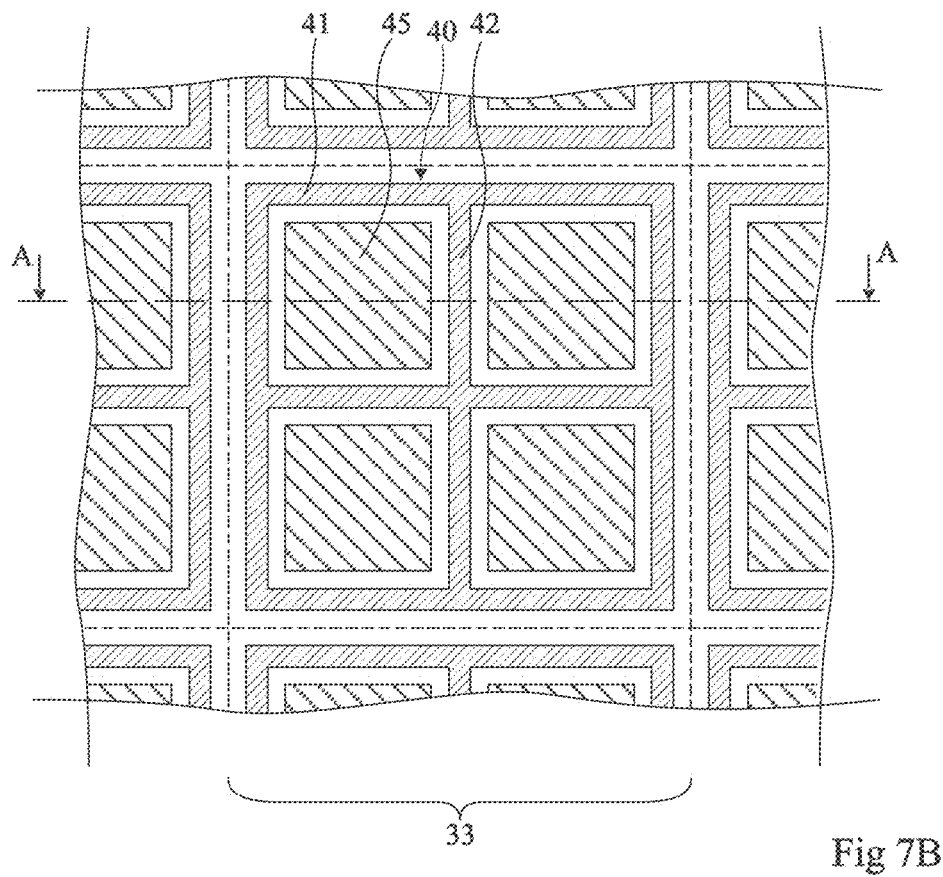

FIGS. 7A and 7B respectively show a cross-section view and a top view of the lower plate of an intermediate cell 33 having a surface area four times larger than that of cells of smaller size. The upper insulating plate has been designated with reference numeral 24 and the lower insulating plate has been designated with reference numeral 25. As in FIGS. 4 and 5, the upper insulating plate supports an upper electrode 28 common to all cells. For each cell 33, two electrodes are formed on the lower insulating plate: an actual detection electrode designated with reference numeral 40 and a reference electrode designated with reference numeral 45.

Figure 8A:
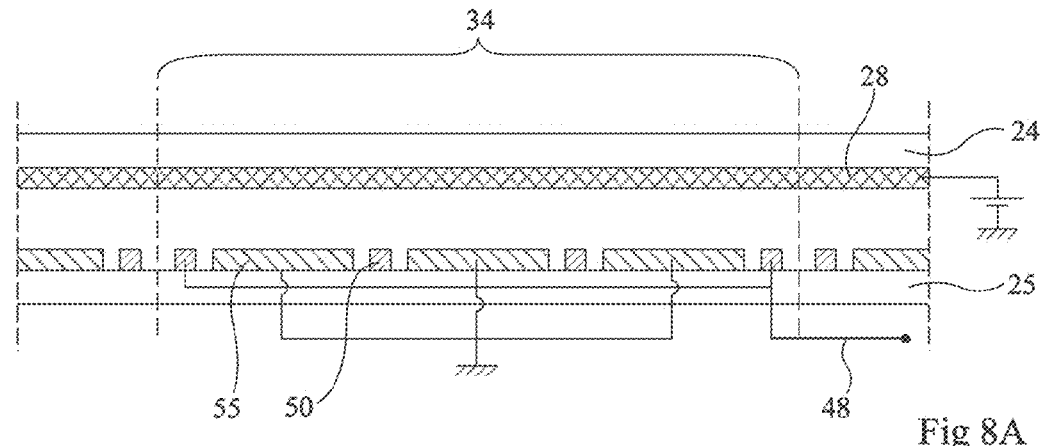
FIGS. 8A and 8B respectively are a cross-section view and a top view of an embodiment of an elementary cell of nonuple surface area.

As illustrated in the top view of the lower plate of FIG. 7B, each detection electrode 40 has a lattice shape and comprises three equidistant horizontal strips 41 connected by three equidistant vertical strips 42. Thus, the reference electrode corresponds to four squares inserted within the lattice forming the detection electrode. These four squares are, as illustrated in FIG. 8A, intended to be grounded while the active electrode is intended to be connected by a terminal 48 to a detection system (possibly via a multiplexer). The field of influence of a moving charged molecule is sufficiently large to induce a signal on a detection electrode 40, even if it is created vertically in line with a reference electrode 45. This provides a complete measurement with no loss of relevant information of the characteristics of X-ray beam.

The detection system is selected so that output terminal 48 is connected in operation to a virtual ground. Thus, the two detection and reference electrodes appear, for the charges created in the ionization chamber, as being at the same reference potential (currently, the ground).

The total surface area of lattice detection electrode 40 is substantially equal to the surface area of detection electrode 29 (see FIG. 4) of the cell of smaller size. Actually, the surface area of detection electrode 40 is not strictly equal to the surface area of electrode 29 of FIG. 4. Indeed, each detection electrode detects not only the charges which directly hit it, but also half of the charges which hit the neutral area of the lower plate between each detection electrode portion and the reference electrode portion just next to it. All the detection electrodes are thus designed to have a same "effective surface area" of charge collection, taking into account the foregoing.

Figure 8B:
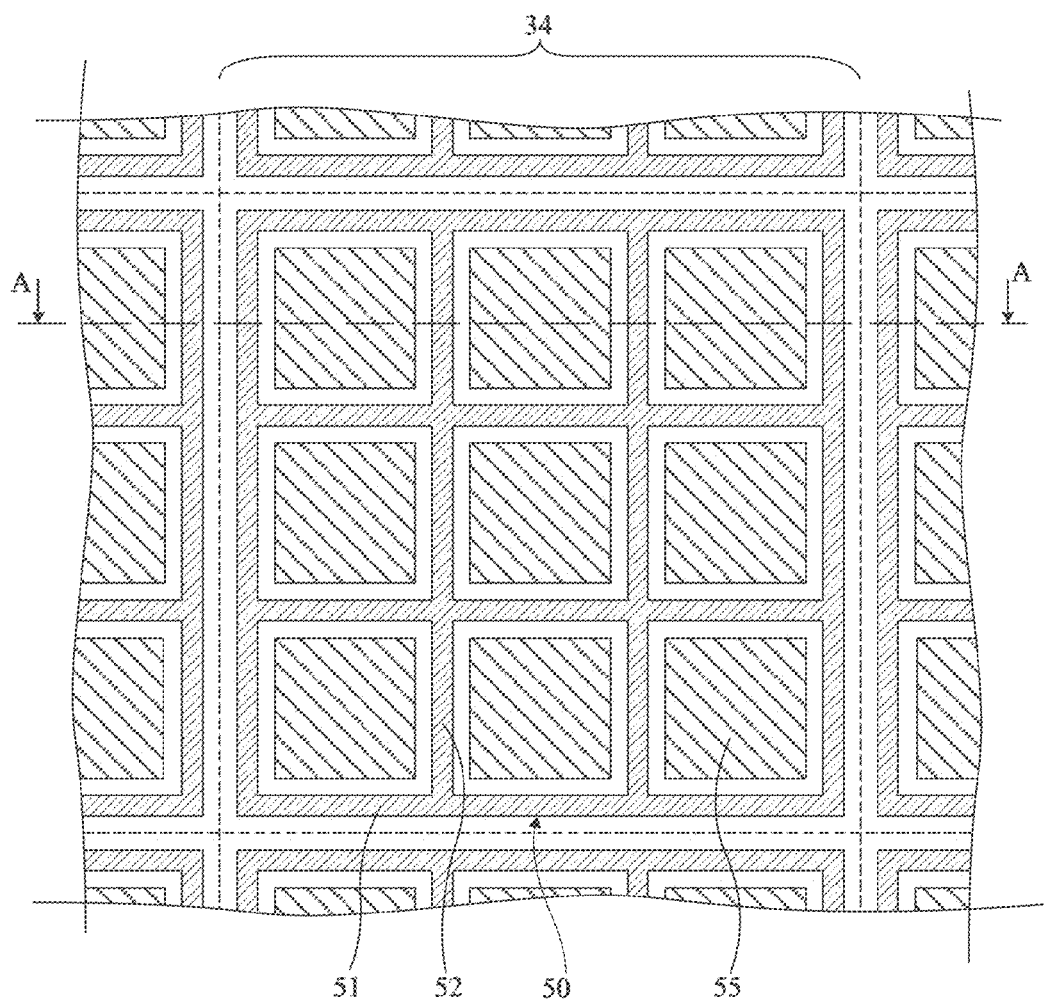

FIGS. 8A and 8B respectively show a cross-section view and a top view of the lower plate of a peripheral cell 34 having a surface area nine times larger than that of cells of smaller size. As illustrated in the top view of the lower plate of FIG. 8B, each electrode has a lattice shape and comprises four equidistant horizontal strips 51, connected by four equidistant vertical strips 52. Thus, reference electrode 55 corresponds to nine squares inserted within the lattice forming detection electrode 50. The effective surface area of the detection electrode is equal to the effective surface area of electrode 29 of the smallest cell described in relation with FIG. 4.

As an example, the smallest cells may have lateral dimensions in the range from 1 to 5 mm, for example 3×3 mm2 In this case, the elementary cells will have a 9-mm2 surface area, the cells of quadruple size will have a 36-mm2 surface area, and the cells of nonuple size will have a 81-mm2 surface area.

The detector may be manufactured from thin supports or sheets, for example, flexible printed circuit boards. The electrodes correspond to metallizations formed on the sheets. Spacers may be provided to ensure a constant spacing between the upper and lower plates.

Specific embodiments have been described. Various alterations and modifications will occur to those skilled in the art. In particular, an embodiment where the detector comprises at its center a first set of cells of small size surrounded with a second set of cells of four times greater size, and then with a third set of cells of nine times greater size has been described in detail. Other dimensional relationships between cells, other topological distributions between the various cells, and other numbers of sets of cells, for example, only two or more than three, may be provided.

Figure 9:
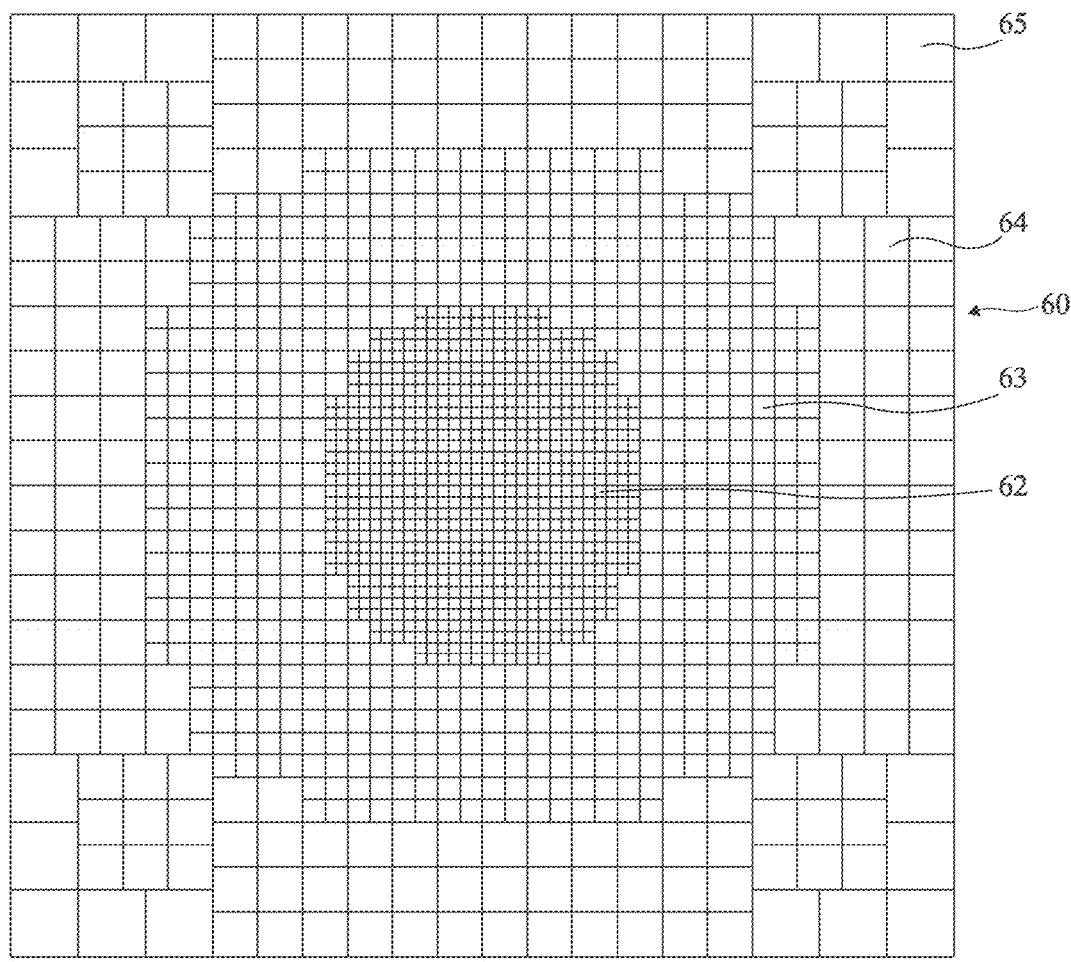
FIG. 9 is a top view of another embodiment of a matrix X-ray detector.

Thus, FIG. 9 is a top view of another embodiment of a matrix X-ray detector 60 where the topological distribution of the various cells is different from that of FIG. 6. Detector 60 comprises a central area 62, an intermediate area 63, a peripheral area 64, and external corner areas 65, each containing detection cells. In top views, the cells of a same area all have the same size and the cells of different areas have different sizes. The essential differences with areas 32, 33, 34 of FIG. 6 are, on the one hand, that the limits of areas 62, 63, and 64 are defined by polygons which approximate circles, rather than being squares, and, on the other hand, that corner areas 65 comprising cells of larger size have been added.

Further, an embodiment where the smallest cells of the detector have the same size as the cells of a conventional matrix detector has been described in detail. It may be provided for such smallest cells to be smaller than the cells of a conventional matrix detector.

Further, specific shapes have been described for the detection electrodes of the largest cells. It should be understood that other shapes may be selected provided that the detection electrodes of the largest cells have the same effective charge collection surface areas as the smallest cells of the detector.

Other arrangements of the ionization chamber may be provided. Particularly, the selection of the upper plate or of the lower plate to support the detection electrodes is arbitrary.

What is claimed is:

1. A matrix device for measuring the characteristics of an X-ray beam, comprising a first set and at least a second set of detection cells, the cells of the first set having a different size than the cells of said at least one second set, each cell corresponding to an ionization chamber comprising a detection electrode, the detection electrodes of all cells having a same effective charge collection surface area.

2. The device of claim 1, comprising three sets of detection cells distributed in a central area, an intermediate area, and a peripheral area.

3. The device of claim 2, wherein the intermediate area contains cells having a surface area four times larger than the surface area of the cells of the central area and the peripheral area contains cells having a surface area nine times larger than the surface area of the cells of the central area.

4. The device of any of claim 1, wherein the detection electrodes of the largest cells have a lattice shape and the spaces delimited by each lattice are occupied by reference electrodes connected to a reference potential.

5. The device of claim 4, wherein the reference potential is the ground and the detection electrodes are connected, in operation, to a virtual ground.

* * * * *